(12) United States Patent
Nakamura

(10) Patent No.: US 6,674,499 B2
(45) Date of Patent: Jan. 6, 2004

(54) ACTIVE MATRIX LIQUID CRYSTAL DISPLAY APPARATUS

(75) Inventor: Yayoi Nakamura, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 229 days.

(21) Appl. No.: 10/006,628

(22) Filed: Nov. 8, 2001

(65) Prior Publication Data
US 2002/0057391 A1 May 16, 2002

(30) Foreign Application Priority Data
Nov. 15, 2000 (JP) .................................. 2000-347711

(51) Int. Cl.[7] .............................................. G02F 1/1335
(52) U.S. Cl. ...................................................... 349/106
(58) Field of Search .................... 349/65, 106; 359/368; 370/352

(56) References Cited

U.S. PATENT DOCUMENTS 5,914,760 A * 6/1999 Daiku .......................... 349/65
6,038,006 A * 3/2000 Sasaki et al. ................ 349/106
6,181,691 B1 * 1/2001 Markgraf et al. ............ 370/352

* cited by examiner

Primary Examiner—John F. Niebling
Assistant Examiner—Andre C Stevenson
(74) Attorney, Agent, or Firm—Frishauf, Holtz, Goodman & Chick, P.C.

(57) ABSTRACT

There is disclosed an active matrix liquid crystal display apparatus in which a data signal line is disposed apart from a pixel electrode, a gate insulating film is disposed between the data signal line and an extending portion of an auxiliary capacity line, the extending portion is superposed upon a peripheral portion of the pixel electrode, and a parasitic capacity Cds between the pixel electrode and the data signal line is reduced.

16 Claims, 4 Drawing Sheets

ACTIVE MATRIX LIQUID CRYSTAL DISPLAY APPARATUS

CROSS-REFERENCE TO RELATED APPLICATIONS

This application is based upon and claims the benefit of priority from the prior Japanese Patent Application No. 2000-347711, filed Nov. 15, 2000, the entire contents of which are incorporated herein by reference.

BACKGROUND OF THE INVENTION

1. Field of the Invention

The present invention relates to an active matrix liquid crystal display apparatus in which a cross talk can be reduced.

2. Description of the Related Art

FIG. 3 is a partially see through, plan view of a part of an exemplary conventional active matrix liquid crystal display apparatus. The active matrix liquid crystal display apparatus includes a glass substrate 1. A plurality of scanning signal lines 2 and data signal lines 3 are disposed on an upper surface of the glass substrate 1 in a matrix form. A thin-film transistor 4 and pixel electrode 5 are disposed in the vicinity of each of intersections of the lines, and an auxiliary capacity line 6 is disposed in parallel to the scanning signal line 2 under an upper side of the pixel electrode 5.

The pixel electrodes 5 are delta-arranged. That is, three colors i.e. red (R), green (G), and blue (B) pixel electrodes 5 constituting one pixel are disposed in positions corresponding to one of vertexes of an isosceles triangle (Greek character Δ) respectively. Therefore, the scanning signal line 2 linearly extends in a row direction between the upper and lower pixel electrodes 5 (FIG. 3), and the data signal line 3 is disposed in a meandered manner in a column direction between the left and right pixel electrodes 5 (FIG. 3) and between the upper and lower pixel electrodes 5.

A concrete structure of the active matrix liquid crystal display apparatus will next be described with reference to FIG. 4. FIG. 4 is a sectional view taken along line IV—IV of FIG. 3. The scanning signal lines 2 including gate electrodes 11 are disposed in predetermined positions on the upper surface of the glass substrate 1, each of the auxiliary capacity lines 6 is disposed in another predetermined position, and a gate insulating film 12 of silicon nitride is disposed on the whole upper surface of the substrate. A semiconductor thin film 13 of intrinsic amorphous silicon is disposed in a predetermined position on the upper surface of the gate insulating film 12 on the gate electrode 11. A channel protection film 14 of silicon nitride is disposed in a predetermined position on the upper surface of the semiconductor thin film 13. Ohmic contact layers 15, 16 of n-type amorphous silicon are disposed on opposite sides of the upper surface of the channel protection film 14 and on the upper surface of the semiconductor thin film 13 on the opposite sides of the channel protection film.

The data signal line 3 including a drain electrode 17 is disposed in a predetermined position on the upper surface of one ohmic contact layer 16 and on the upper surface of the gate insulating film 12. In this case, the data signal line 3 has a three-layered structure of an intrinsic amorphous silicon film 3a, n-type amorphous silicon film 3b, and metal film 3c. When the semiconductor thin film 13 is formed, the intrinsic amorphous silicon film 3a is simultaneously formed by the same film as the semiconductor thin film 13. When the ohmic contact layers 15, 16 are formed, the n-type amorphous silicon film 3b is simultaneously formed by the same film as the ohmic contact layers 15, 16. When the drain electrode 17 is formed of metal such as chromium, the metal film 3c is simultaneously formed by the same film as the drain electrode 17.

A source electrode 18 of chromium, and the like is disposed on the upper surface of the other ohmic contact layer 15. Here, the gate electrode 11, gate insulating film 12, semiconductor thin film 13, channel protection film 14, ohmic contact layers 15, 16, drain electrode 17, and source electrode 18 constitute the thin film transistor 4. A flatted film (interlayer insulating film) 19 of resin is disposed on the whole upper surface of the gate insulating film 12 including the thin film transistor 4. The pixel electrode 5 of ITO is disposed in a predetermined position on the upper surface of the flatted film 19. The pixel electrode 5 is connected to the source electrode 18 via a contact hole 20 formed in the flatted film 19.

In the aforementioned conventional active matrix liquid crystal display apparatus, the flatted film 19 of the resin is formed by a spin coat process, and the film is formed to be relatively thick in about several micrometers. Therefore, even when the pixel electrode 5 is superposed upon the data signal line 3, no short-circuit occurs between the pixel electrode 5 and the data signal line 3. For the data signal line 3, a width of a portion extending in the column direction is set to be slightly larger than a width of a portion extending in the row direction. Opposite ends of a width direction of the data signal line 3 having a large width and extending in the column direction are superposed upon adjacent side portions of the pixel electrodes 5 disposed adjacent to the data signal line in a left-to-right direction. Moreover, a function of a shield film is imparted to the data signal line 3 extending in the column direction, and this increases an opening ratio. In one example, an interval G of two pixel electrodes 5 adjacent to each other in the left-to-right direction is set to a minimum interval of 4 μm to such an extent that any short-circuit does not occur between the pixel electrodes. Moreover, in consideration of an alignment precision, and the like, an overlap width L of the pixel electrode 5 and data signal line 3 is designed to be 2 μm so that the electrode and line overlap with each other in any case. Then, a minimum width W of the data signal line 3 is 8 μm.

As described above, in the conventional active matrix liquid crystal display apparatus, the opposite ends of the width direction of the data signal line 3 extending in the column direction are superposed upon the adjacent side portions of the pixel electrodes 5 disposed adjacent to each other in the left-to-right direction, and the function of the shield film is imparted to the data signal line 3 extending in the column direction. However, when an area of one pixel electrode 5 is reduced for a highly fine pixel, a vertical cross talk is recognized. That is, when the pixel electrode 5 and data signal line 3 are superposed upon each other, a parasitic capacity Cds increases, and the increase of parasitic capacity Cds is a factor for causing the vertical cross talk. It is known that a ratio β of the parasitic capacity Cds to a total accumulated capacity Cp of one pixel electrode 5 is β=Cds/Cp=Cds/(Cds+Clc+Cs+Cgs). When the ratio β is reduced, the vertical cross talk is securely prevented from occurring. Here, Clc is a capacity of a liquid crystal between one pixel electrode 5 and an opposite electrode (not shown), Cs is an accumulated capacity (hereinafter referred to as an auxiliary capacity) between the pixel electrode 5 and the auxiliary capacity line 6, and Cgs is a parasitic capacity between the pixel electrode 5 and the scanning signal line 2. However, since the active matrix liquid crystal display apparatus tends to be gradually highly refined, and the area of the pixel electrode is accordingly reduced, Clc is reduced, and the vertical cross talk increasingly becomes conspicuous.

BRIEF SUMMARY OF THE INVENTION

An object of the present invention is to reduce a parasitic capacity Cds between a pixel electrode and a data signal line so that a cross talk becomes inconspicuous.

According to the present invention, there is provided an active matrix liquid crystal display apparatus comprising: a substrate; a plurality of pixel electrodes formed on the substrate; a plurality of switching elements electrically connected to the pixel electrodes, respectively; a plurality of data signal lines connected to the switching elements; a first insulating layer disposed between the data signal lines and the pixel electrodes; an auxiliary capacity line partially overlapping with each pixel electrode; and a second insulating layer disposed between the data signal lines and the auxiliary capacity lines, each auxiliary capacity line having a portion overlapping with the data signal line, the portion having a width larger than a width of the data signal line disposed right above the auxiliary capacity line, and overlapping with a peripheral edge of the pixel electrode.

DETAILED DESCRIPTION OF THE INVENTION

Figure 1:
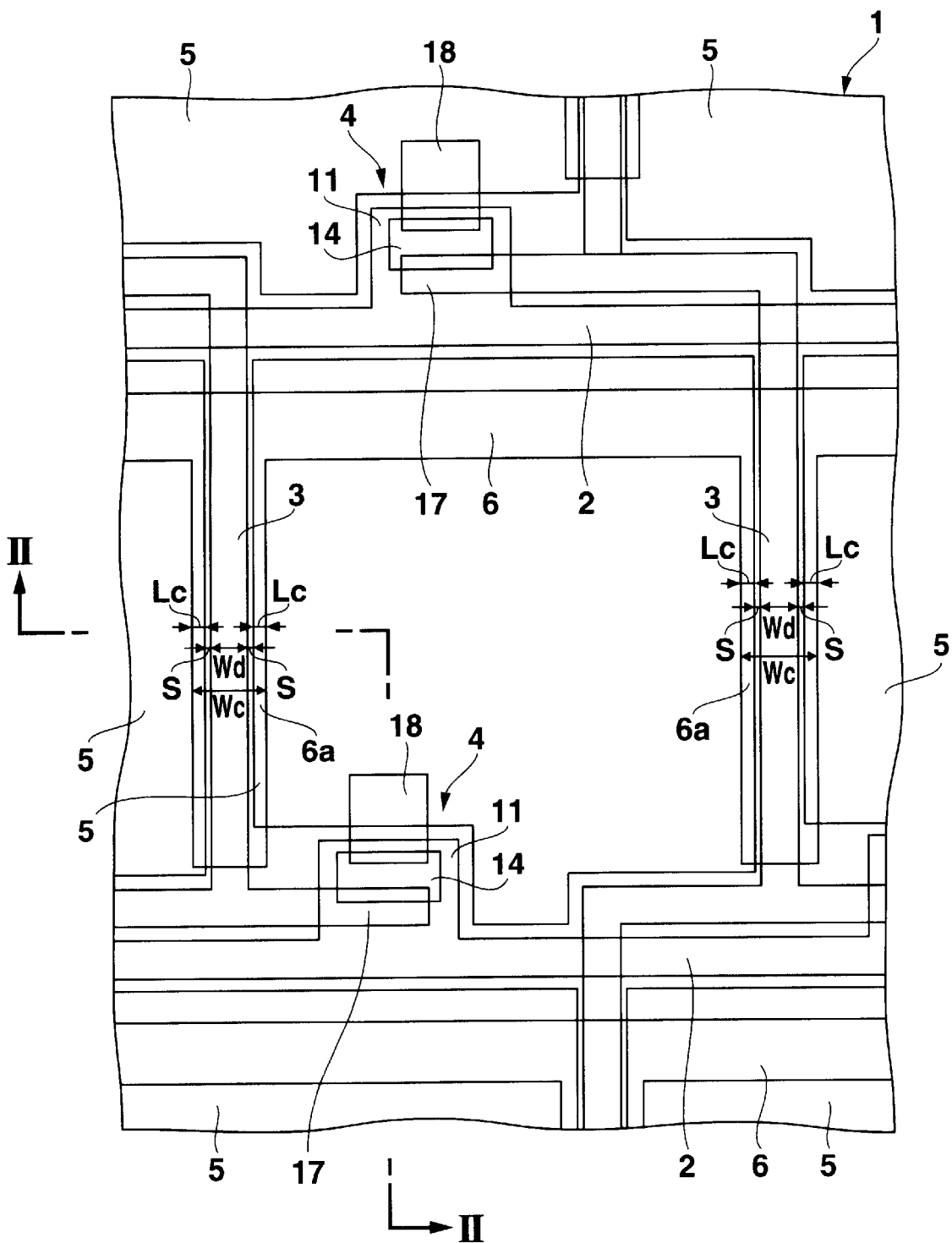
FIG. 1 is an enlarged plan view of a main part of an active matrix type liquid crystal display apparatus according to one embodiment of the present invention.
Figure 2:
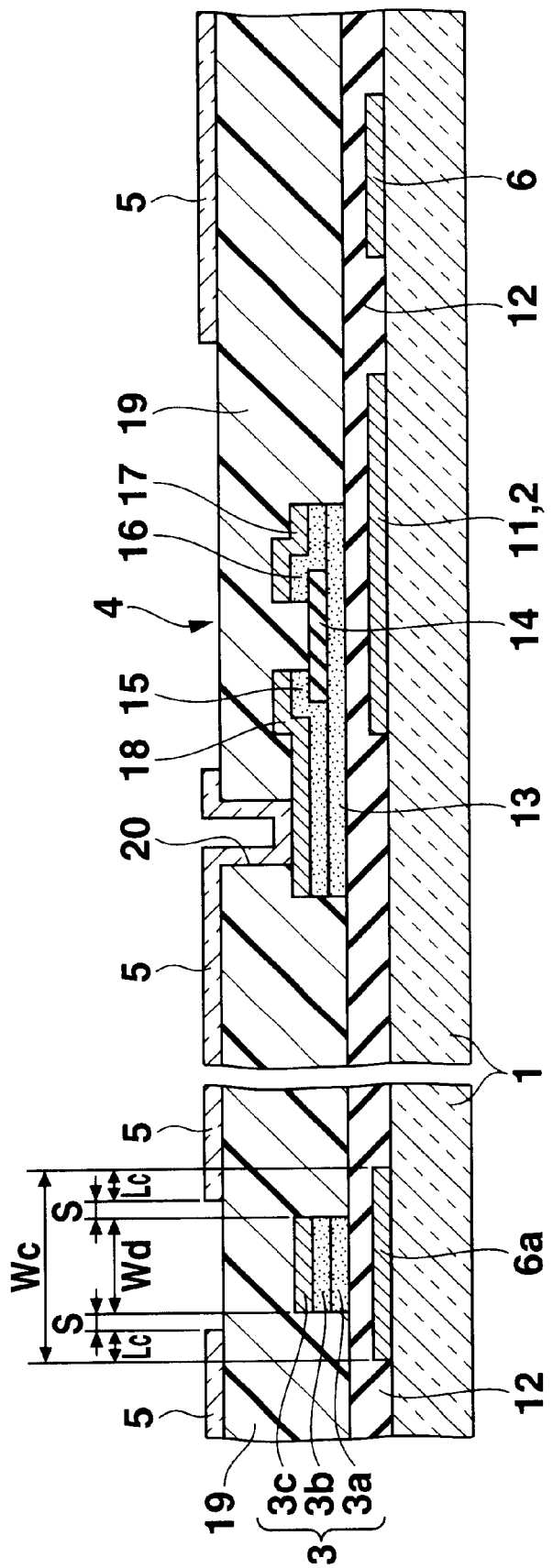
FIG. 2 is a sectional view taken along line II—II of FIG. 1.
Figure 3:
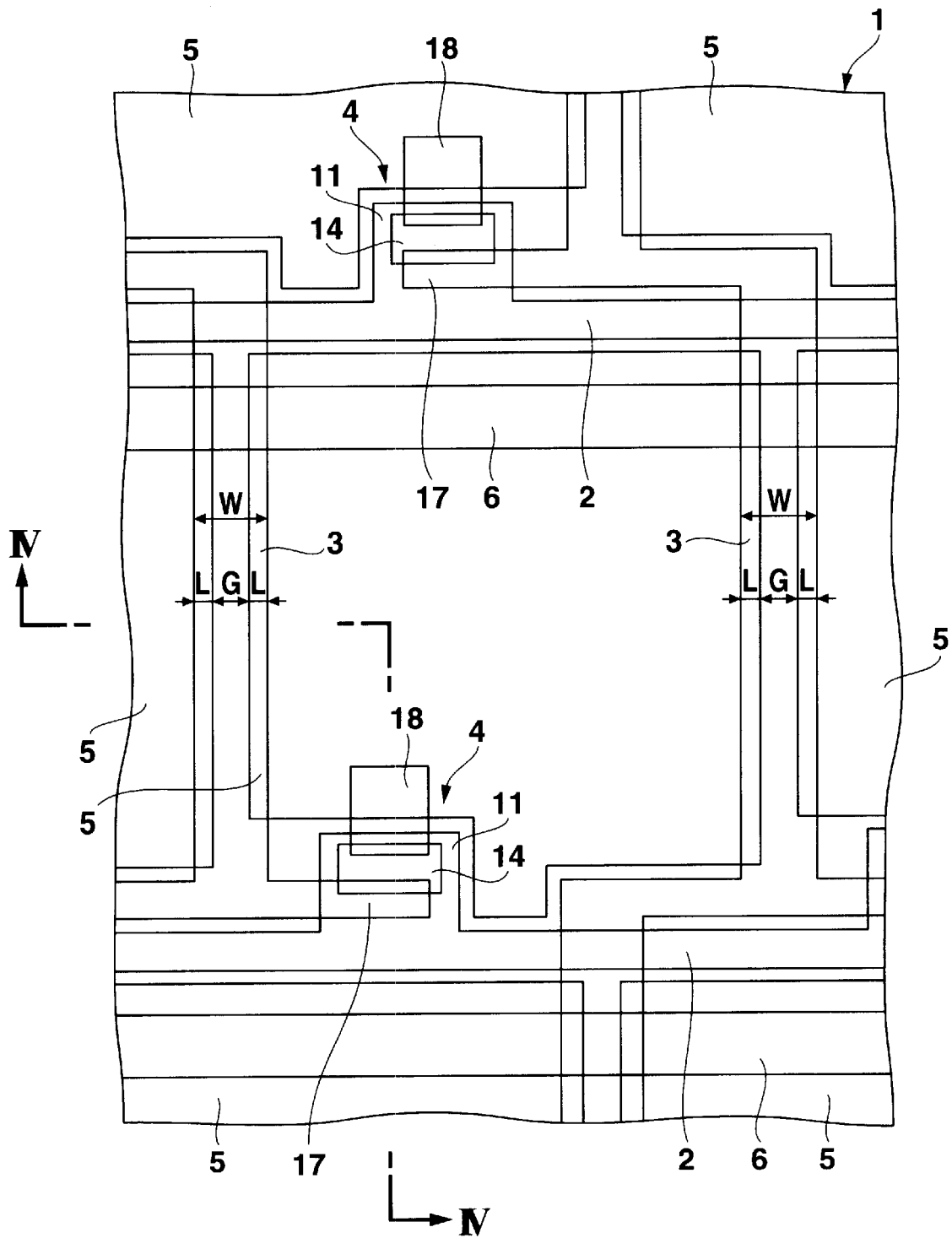
FIG. 3 is an enlarged plan view of a part of a conventional active matrix type liquid crystal display apparatus.
Figure 4:
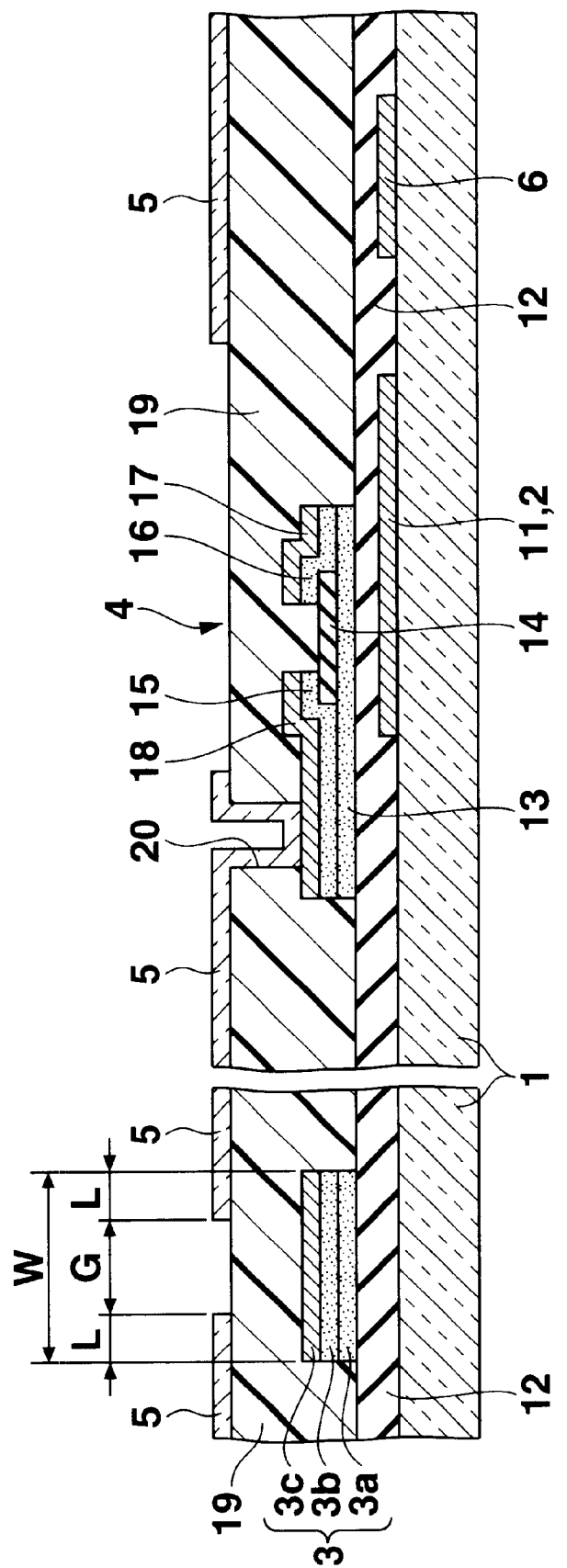
FIG. 4 is a sectional view taken along line IV—IV of FIG. 3.

FIG. 1 is a plan view of a main part of an active matrix type liquid crystal display apparatus according to one embodiment of the present invention, and FIG. 2 is a sectional view taken along line II—II of FIG. 1. In these figures, for the sake of convenience of description, substantially the same members as conventional members shown in FIGS. 3 and 4 are denoted with the same reference numerals.

As shown in FIG. 1, the active matrix liquid crystal display apparatus includes a transparent substrate such as a glass substrate 1. A plurality of scanning signal lines 2 and data signal lines 3 are disposed on an upper surface of the glass substrate 1 in a matrix form. A thin-film transistor 4 and pixel electrode 5 are disposed in the vicinity of each of intersections of the lines 2, 3, and an auxiliary capacity line 6 is disposed in parallel to the scanning signal line 2 under an upper side of the pixel electrode 5.

The pixel electrodes 5 are delta-arranged. That is, three colors i.e. red (R), green (G), and blue (B) pixel electrodes 5 constituting one pixel are disposed in positions corresponding to one of vertexes of an isosceles triangle, respectively. Therefore, the scanning signal line 2 is linearly extended in a row direction between the upper and lower pixel electrodes 5, and the data signal line 3 has a width Wd, and is disposed in a meandered manner in a column direction between the left and right pixel electrodes 5 and between the upper and lower pixel electrodes 5.

An extending portion 6a having a width Wc extends in an arrangement direction of the data signal line 3 extending in the column direction from a portion of the auxiliary capacity line 6 intersecting the data signal line 3 of the auxiliary capacity line 6 so that both longitudinal axes preferably agree with each other. The width Wc of the extending portion 6a is larger than the width Wd of the data signal line 3. Each of left and right side portions of the pixel electrode 5 is superposed upon the extending portion 6a of the auxiliary capacity line with an overlap width Lc, but is not superposed upon the data signal line 3, and is apart from the line at a space S.

A concrete structure of the active matrix liquid crystal display apparatus will next be described with reference to FIG. 2. The scanning signal line 2 including gate electrodes 11 is disposed in a predetermined position on the upper surface of the glass substrate 1, the auxiliary capacity line 6 including the extending portion 6a is disposed in another predetermined position, and a gate insulating film 12 of silicon nitride is disposed on the whole upper surface of the substrate. A semiconductor thin film 13 of intrinsic amorphous silicon is disposed in a predetermined position on the upper surface of the gate insulating film 12 above the gate electrode 11. A channel protection film 14 of silicon nitride is disposed in a predetermined position on the upper surface of the semiconductor thin film 13. Ohmic contact layers 15, 16 of n-type amorphous silicon are disposed on opposite sides of the upper surface of the channel protection film 14 and on the upper surface of the semiconductor thin film 13 on the opposite sides of the channel protection film.

The data signal line 3 including drain electrodes 17 is disposed in a predetermined position on the upper surface of one ohmic contact layer 16 and on the upper surface of the gate insulating film 12. In this case, the data signal line 3 has a three-layered structure of an intrinsic amorphous silicon film 3a, n-type amorphous silicon film 3b, and metal film 3c. When the semiconductor thin film 13 is formed, the intrinsic amorphous silicon film 3a is simultaneously formed by the same film as the semiconductor thin film 13. When the ohmic contact layers 15, 16 are formed, the n-type amorphous silicon film 3b is simultaneously formed by the same film as the ohmic contact layers 15, 16. When the drain electrode 17 is formed of metal such as chromium, the metal film 3c is simultaneously formed by the same film as the drain electrode 17.

A source electrode 18 of chromium, and the like is disposed on the upper surface of the other ohmic contact layer 15. Here, the gate electrode 11, gate insulating film 12, semiconductor thin film 13, channel protection film 14, ohmic contact layers 15, 16, drain electrode 17, and source electrode 18 constitute the thin film transistor 4. A flatted film (interlayer insulating film) 19 of resin is disposed on the whole upper surface of the gate insulating film 12 including the thin film transistor 4, and the like. The pixel electrode 5 of ITO is disposed in a predetermined position on the upper surface of the flatted film 19. The pixel electrode 5 is connected to the source electrode 18 via a contact hole 20 formed in the flatted film 19. A thickness of the auxiliary capacity line 6 is in a range of 1500 to 3000 angstroms, the thickness of the gate insulating film 12 is in a range of 2000 to 4000 angstroms, the thickness of the semiconductor thin film 13 is in a range of 200 to 1000 angstroms, the thickness of the channel protection film 14 is in a range of 1000 to 2000 angstroms, the thickness of the ohmic contact layers 15, 16 is in a range of 300 to 1000 angstroms, the thickness of the drain electrode 17 and source electrode 18 is in a range of 3000 to 5000 angstroms, and the thickness of the flatted film 19 is of the order of 1 to 4 $\mu$m.

As described above, in the active matrix liquid crystal display apparatus, the extending portion 6a which is broader than the data signal line 3 extends in the arrangement direction of the data signal line 3 from the portion of the auxiliary capacity line 6 intersecting the data signal line 3. Each of the left and right side portions of the pixel electrode 5 is not superposed upon the data signal line 3, and are superposed upon the extending portion 6a. Then, the parasitic capacity Cds between the pixel electrode 5 and the data signal line 3 can be reduced. Therefore, the area of one pixel electrode 5 is reduced for a highly fine pixel, and the corresponding liquid crystal capacity Clc is reduced. Even in this case, a ratio β of the parasitic capacity Cds to a total accumulated capacity Cp of one pixel electrode 5 {β=Cds/Cp=Cds/(Cds+Clc+Cs+Cgs)} can be set to a small value such that any vertical cross talk is not visually recognized.

Here, an experiment result will be described. First, the thickness of the flatted film 19 formed of resin by a spin coat process was set to 3 μm, and a permittivity of the flatted film 19 was set to 3.0. In the embodiment shown in FIG. 1, an interval S between the left or right side portion of the pixel electrode 5 and the data signal line 3 was set to be of the order of 0 to 1 μm. Then, the parasitic capacity Cds was of the order of 0.02 to 0.03 fF/μm. On the other hand, in the conventional example shown in FIG. 3, a width L of an overlap portion between the left or right side portion of the pixel electrode 5 and the data signal line 3 was set to be of the order of 1 to 2 μm. Then, the parasitic capacity Cds was about 0.1 fF/μm. Therefore, in the present embodiment, the parasitic capacity Cds can be reduced to be of the order of ¼ to ⅕ of a coupled capacity Cds of the conventional example. Here, according to a visual recognition test, the present inventor was able to confirm that the vertical cross talk was not visually recognized at the ratio β of 0.045 or less of the parasitic capacity Cds to the total accumulated capacity Cp of one pixel electrode 5 {β=Cds/Cp=Cds/(Cds+Clc+Cs+Cgs)}, and was conspicuous at the ratio exceeding 0.045. In the present invention, β is of the order of 0.02 to 0.03, and in the conventional example, β is of the order of 0.07 to 0.08. Therefore, it is remarkably important to set the ratio β of the parasitic capacity Cds to the total accumulated capacity Cp of one pixel electrode 5 to 0.045 or less.

In the active matrix liquid crystal display apparatus, the left and right side portions of the pixel electrode 5 are superposed upon the extending portions 6a of the auxiliary capacity lines 6. Therefore, when a function of a shield film is imparted to the extending portion 6a, an opening ratio can be increased. Additionally, even when the width Lc of the overlap portion of the left or right side portion of the pixel electrode 5 with the extending portion 6a, the interval S between the pixel electrode 5 and the data signal line 3, and the width Wd of the data signal line 3 are considered, a minimum width of the extending portion 6a can be set to be of the order of 8 to 9 μm. The opening ratio substantially equal to that of the conventional example shown in FIG. 3 (the minimum width of the data signal line 3 is 8 μm) can be obtained.

Moreover, when the thickness of the flatted film 19 of the resin is relatively thick in about several micrometers, the accumulated capacity Cs between the pixel electrode and the auxiliary capacity line is reduced. Therefore, the ratio β of the parasitic capacity Cds to the total accumulated capacity Cp of the pixel electrode 5 cannot be reduced. However, in the present invention, the extending portions 6a are provided with the auxiliary capacity lines 6, and overlap with the pixel electrode 5 by a total overlap width 2Lc. Therefore, the accumulated capacity Cs between the pixel electrode and the auxiliary capacity line increases, and the ratio β of the parasitic capacity Cds to the total capacity of one pixel electrode 5 can be reduced.

As described above, according to the present invention, the width of the data signal line is set to be equal to or less than the interval between the adjacent pixel electrodes. Therefore, the parasitic capacity Cds between the pixel electrode and the data signal line can be reduced, and further the width of the extending portion of the auxiliary capacity line is formed to be larger than that of the data signal line. Therefore, when the function of the shield film is imparted to the extending portion, the opening ratio can be increased.

What is claimed is:

1. An active matrix liquid crystal display apparatus comprising:

a substrate;

a plurality of pixel electrodes formed on said substrate;

a plurality of switching elements electrically connected to said pixel electrodes, respectively;

a plurality of data signal lines connected to said switching elements;

a first insulating layer disposed between said data signal lines and said pixel electrodes;

an auxiliary capacity line partially overlapping with each pixel electrode; and a second insulating layer disposed between said data signal lines and said auxiliary capacity lines, each auxiliary capacity line having a portion overlapping with said data signal line, the portion having a width larger than a width of the data signal line disposed right above the auxiliary capacity line, and overlapping with a peripheral edge of said pixel electrode.

2. The active matrix liquid crystal display apparatus according to claim 1, wherein a ratio β=Cds/Cp of a parasitic capacity Cds between said pixel electrode and said data signal line to a total accumulated capacity Cs of said pixel electrode is 0.045 or less.

3. The active matrix liquid crystal display apparatus according to claim 1, wherein a parasitic capacity Cds between said pixel electrode and said data signal line is 0.03 fF/μm or less.

4. The active matrix liquid crystal display apparatus according to claim 1, wherein said part of said auxiliary capacity line extends along said data signal line.

5. The active matrix liquid crystal display apparatus according to claim 2, wherein said part of said auxiliary capacity line extends along a pair of opposite sides of said pixel electrode.

6. The active matrix liquid crystal display apparatus according to claim 1, wherein said data signal line does not overlap with said pixel electrode.

7. The active matrix liquid crystal display apparatus according to claim 6, wherein said data signal line is apart from said pixel electrode by 0 to 1 μm.

8. The active matrix liquid crystal display apparatus according to claim 1, wherein said first insulating layer and said second insulating layer are formed of different materials.

9. The active matrix liquid crystal display apparatus according to claim 1, wherein said first insulating layer has a thickness larger than that of said second insulating layer.

10. The active matrix liquid crystal display apparatus according to claim 1, wherein said first insulating layer has a thickness in a range of 1 μm to 4 μm.

11. An active matrix liquid crystal display apparatus comprising:

a substrate;

a plurality of pixel electrodes formed on said substrate;

a plurality of switching elements electrically connected to said pixel electrodes, respectively;

a plurality of data signal lines connected to said switching element; and an insulating layer disposed between said data signal line and said pixel electrode, a ratio β=Cds/Cp of a parasitic capacity Cds between said pixel electrode and said data signal line to a total accumulated capacity Cs of said pixel electrode being 0.045 or less.

12. The active matrix liquid crystal display apparatus according to claim 11, wherein a parasitic capacity Cds between said pixel electrode and said data signal line is 0.03 fF/μm or less.

13. The active matrix liquid crystal display apparatus according to claim 11, wherein said data signal line does not overlap with said pixel electrode.

14. The active matrix liquid crystal display apparatus according to claim 11, wherein said data signal line is apart from said pixel electrode by 0 to 1 μm.

15. The active matrix liquid crystal display apparatus according to claim 11, wherein said insulating layer is formed of a resin.

16. The active matrix liquid crystal display apparatus according to claim 11, wherein said insulating layer has a thickness in a range of 1 μm to 4 μm.

* * * * *